United States Patent
Poonawalla et al.

(10) Patent No.: US 8,761,006 B2
(45) Date of Patent: Jun. 24, 2014

(54) METHOD AND APPARATUS FOR PROVISIONING A BACKUP SIGNALING CHANNEL

(75) Inventors: Fakhri Poonawalla, Holmdel, NJ (US); Ellen Feinberg, Morganville, NJ (US); Jerry Robinson, Middletown, NJ (US); John Siegel, Marlboro, NJ (US); Thomas Will, Skillman, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 520 days.

(21) Appl. No.: 12/577,821

(22) Filed: Oct. 13, 2009

(65) Prior Publication Data

US 2011/0085441 A1    Apr. 14, 2011

(51) Int. Cl.
*H04J 1/16*    (2006.01)

(52) U.S. Cl.
USPC .......................................... 370/228; 370/242

(58) Field of Classification Search
USPC .......................... 370/216–228, 241–244, 401
See application file for complete search history.

(56) References Cited

U.S. PATENT DOCUMENTS

| | | | | |
|---|---|---|---|---|
| 5,831,969 A | * | 11/1998 | Bales et al. | 370/225 |
| 7,300,214 B2 | * | 11/2007 | Doo et al. | 385/92 |
| 7,397,793 B2 | * | 7/2008 | Urquizo et al. | 370/356 |

* cited by examiner

*Primary Examiner* — Kan Yuen

(57) ABSTRACT

In one embodiment, the present disclosure is a method and apparatus for provisioning a backup signaling channel. In one embodiment, a method for provisioning a backup D channel in a media gateway includes provisioning a primary D channel on a first media gateway card in the media gateway and provisioning the backup D channel on a second media gateway card in the media gateway that is different from the first media gateway card, wherein the backup D channel backs up the primary D channel.

4 Claims, 4 Drawing Sheets

METHOD AND APPARATUS FOR PROVISIONING A BACKUP SIGNALING CHANNEL

FIELD OF THE DISCLOSURE

The present disclosure relates generally to telephone system networks and relates more particularly to the provisioning of signaling channels for integrated services digital networks (ISDN) on a media gateway.

ISDN is a time division multiplexing (TDM) technology that enables traditional telephone lines to carry voice, digital network services, and video. The need to provision ISDN on media gateways is driven by modernization of networks as well as the need to maintain existing TDM access types for legacy customers.

Interfaces to ISDN typically comprise a plurality of bearer or "B" channels for carrying the primary data or voice communications and one "D" channel used for carrying control and signaling information. Some interfaces may further include a second D channel, where one of the D channels operates as a primary D channel and the other operates as a backup D channel in the event of a failure of the primary.

Network vendors typically require that the primary and backup D channels be provisioned on the same media gateway card. This requirement imposes constraints on the provisioning rules for backup D channel configurations that complicate information technology (IT) systems development. In addition, the ordering process is complicated because the ordering specialist must know on which media gateway card the primary D channel resides and must also verify that the media gateway card has enough available capacity to accommodate the backup D channel. If the media gateway card does not have enough available capacity, the primary D channel must be moved to a new media gateway card that can also accommodate the backup D channel.

Moreover, if the media gateway card fails, then both the primary and the backup D channels will fail, essentially defeating the purpose of provisioning the backup D channel.

SUMMARY

In one embodiment, the present disclosure is a method and apparatus for provisioning a backup signaling channel. In one embodiment, a method for provisioning a backup D channel in a media gateway includes provisioning a primary D channel on a first media gateway card in the media gateway and provisioning the backup D channel on a second media gateway card in the media gateway that is different from the first media gateway card, wherein the backup D channel backs up the primary D channel.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure is a method and apparatus for provisioning a backup signaling channel for ISDN applications. Embodiments of the disclosure provision a backup D channel on any media gateway card, wherein the media gateway card on which the backup D channel is provisioned is not necessarily the same media gateway card on which the primary D channel resides. This significantly simplifies IT system development to support mechanized provisioning of backup D channels. It also simplifies the ordering process for backup D channels.

Figure 1:
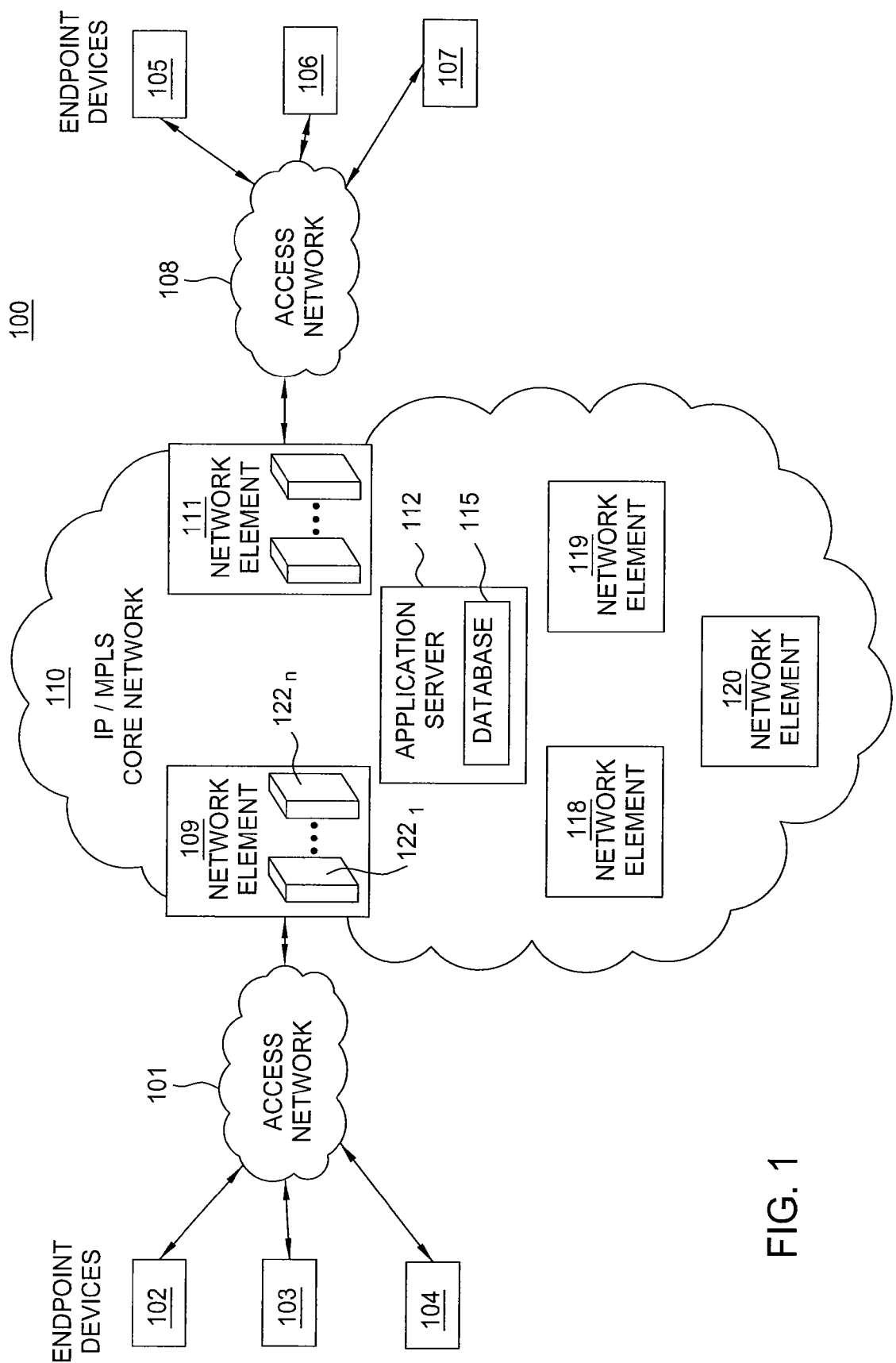
FIG. 1 is a block diagram illustrating an exemplary packet network, configured according to embodiments of the current disclosure.

FIG. 1 is a block diagram illustrating an exemplary packet network 100, configured according to embodiments of the current disclosure. Exemplary packet networks include Internet protocol (IP) networks, Ethernet networks, and the like. An IP network is broadly defined as a network that uses Internet Protocol such as IPv4 or IPv6 to exchange data packets.

In one embodiment, a first plurality of endpoint devices 102-104 reside outside the packet network and are configured for communication with the core packet network 110 (e.g., an IP-based core backbone network) via a first access network 101. Similarly, a second plurality of endpoint devices 105-107 reside outside the packet network and are configured for communication with the core packet network 110 via a second access network 108. Some of the access networks 101, 108 are packet networks, while some of the access networks 101, 108 are TDM networks.

The network elements (NEs) 109-120 may serve as gateway servers or edge routers for the core packet network 110. In one embodiment, the first and second plurality of endpoint devices 102-104 and 105-107 comprise ISDN private branch exchanges (PBXs), automatic call distributors (ACDs), or ISDN telephones. In one embodiment, the first and second access networks 101 and 108 are time division multiplex (TDM) networks.

The endpoint devices 102-107 may comprise customer endpoint devices such as personal computers, laptop computers, Personal Digital Assistants (PDAs), landline telephones, cellular telephones, servers, routers, and the like. In one embodiment, at least some of the endpoint devices 102-107 are ISDN telephones. The first and second access networks 101 and 108 serve as a means to establish a connection between the endpoint devices 102-107 and the NEs 109 and 111 of the core packet network 110. Thus, the endpoint devices 102-107 are outside of the access networks 101 and 108 and the core packet network 110. The first and second access networks 101 and 108 may each comprise a Digital Subscriber Line (DSL) network, a broadband cable access network, a Local Area Network (LAN), a Wireless Access Network (WAN), a third party network, and the like. The first and second access networks 101 and 108 may be either directly connected to NEs 109 and 111 of the core packet network 110, or indirectly through another network.

Some NEs (e.g., NEs 109 and 111) reside at the edge of the packet network 110 and interface with customer endpoint devices 102-107 over various types of access networks (e.g., first and second access networks 101 and 108). An NE that resides at the edge of a core infrastructure is typically implemented as an edge router, a media gateway, a border element, a firewall, a switch, or the like. An NE may also reside within the network (e.g., NEs 118-120) and may be used as a mail server, a router, or a like device. The core packet network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices 102-107, two access networks 101 and 108, and so on are depicted in FIG. 1, the packet network 100 may be expanded by including additional endpoint devices, access networks, border elements, etc. without altering the present disclosure.

As discussed above, one or both of the NEs 109 and 111 in the packet network 100 may be implemented as a media gateway (e.g., a voice over IP or VoIP media gateway) that sits at the edge of the core packet network 110 and interfaces to both the core packet network 110 and the access networks 101 and 108. When the NEs 102 and/or 111 are media gateways, the access networks 101, 108 are not packet networks. As such, an NE configured as a media gateway bridges the TDM (i.e., access networks 101 and 108) and packet (i.e., core packet network 110) domains. In this case, an NE configured as a media gateway comprises a plurality of media gateway cards $122_1$-$122_n$ (hereinafter collectively referred to as "media gateway cards 122") on which a plurality of functionalities are provisioned, including call control and signaling functionalities. As such, at least some of the media gateway cards 122 may have provisioned thereon a D channel. This D channel may be a primary D channel or a backup D channel that operates in the event of a failure of an associated primary D channel.

According to embodiments of the present disclosure, a backup D channel need not necessarily reside on the same media gateway card as the primary D channel with which it is associated. In other words, embodiments of the disclosure allow for the provisioning of a backup D channel on any media gateway card, including a media gateway card that is different from the media gateway card on which the primary D channel is provisioned. Thus, for example, a first media gateway card $122_1$ of FIG. 1 may have provisioned thereon a primary D channel, while the associated backup D channel is provisioned on the $n^{th}$ media gateway card 122. In future implementations, the backup D channel may operate as a backup for a plurality of primary D channels provisioned on a plurality of other (different) media gateway cards 122.

By provisioning the backup D channel on a different card than the primary D channel, IT development associated with provisioning can be greatly simplified, thereby reducing capital expenditure for service providers. In addition, the simplification of the ordering process will reduce operating expenditure. Moreover, because this approach will not require re-provisioning of the primary D channel to a new media gateway card (e.g., when the existing media gateway card cannot support a backup D channel), backup D channels can be provisioned without interrupting service to customers.

Figure 2:
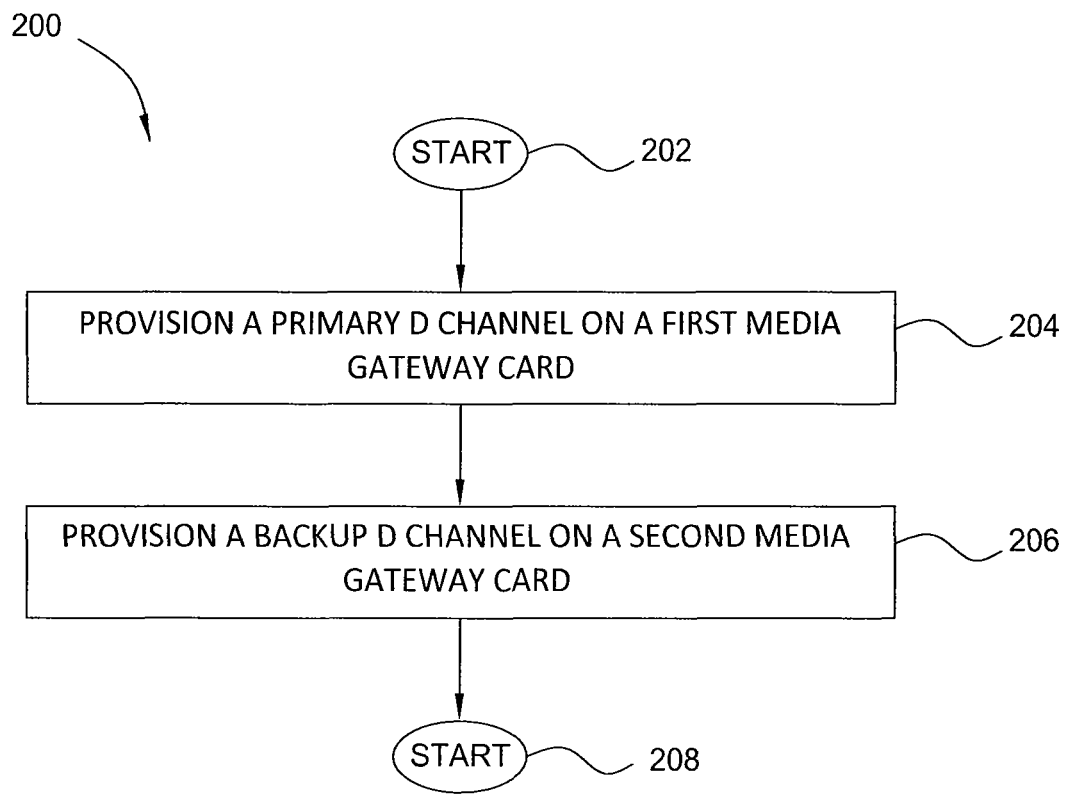
FIG. 2 is a flow diagram illustrating one embodiment of a method for provisioning a backup signaling channel, according to the present disclosure.

FIG. 2 is a flow diagram illustrating one embodiment of a method 200 for provisioning a backup signaling channel, according to the present disclosure. The method 200 may be implemented, for example, at a media gateway, such as the network element 109 in FIG. 1 that is configured as a media gateway. As such, reference will be made in the discussion of FIG. 2 to various elements of the packet network 100 illustrated in FIG. 1. It will be appreciated, however, that the application of the method 200 is not limited to networks configured in the manner illustrated in FIG. 1, and the method 200 may, in fact, have application in networks with alternative configurations.

The method 200 is initialized at step 202 and proceeds to step 204, where a primary D channel is provisioned on a first media gateway card (e.g., media gateway card $122_1$ of FIG. 1). The primary D channel serves as a primary channel for carrying signaling and control information related to calls that are processed by the media gateway 109.

In step 206, a backup D channel is provisioned on a second media gateway card that is different from the first media gateway card (e.g., media gateway card $122_n$ of FIG. 1). The backup D channel will operate to carry signaling and control information related to calls that are processed by the media gateway 109 in the event that the primary D channel fails.

The method 200 terminates in step 208.

Figure 3:
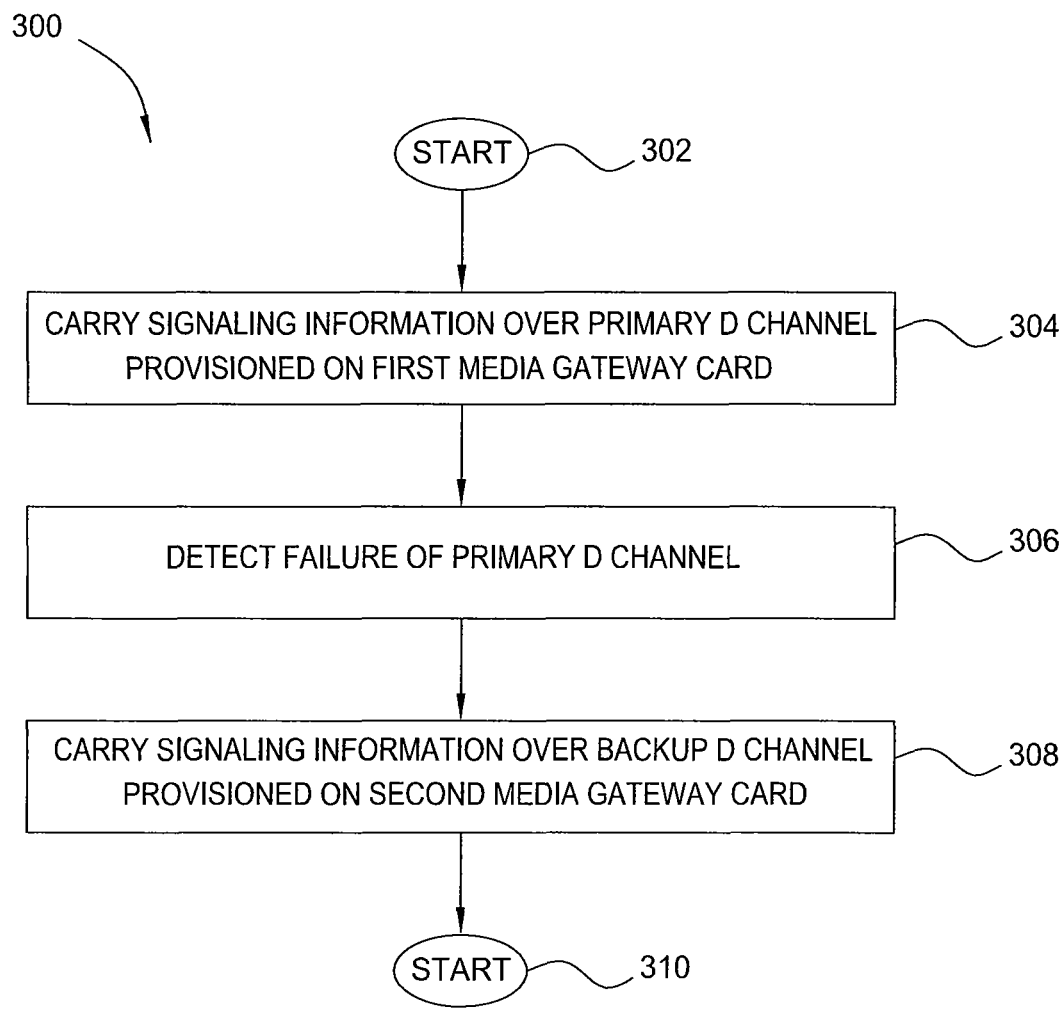
FIG. 3 is a flow diagram illustrating one embodiment of a method for operating a media gateway, according to the present disclosure.

FIG. 3 is a flow diagram illustrating one embodiment of a method 300 for operating a media gateway, according to the present disclosure. The method 300 may be implemented, for example, at a media gateway, such as the network element 109 in FIG. 1 that is configured as a media gateway. As such, reference will be made in the discussion of FIG. 3 to various elements of the packet network 100 illustrated in FIG. 1. It will be appreciated, however, that the application of the method 300 is not limited to networks configured in the manner illustrated in FIG. 1, and the method 300 may, in fact, have application in networks with alternative configurations.

The method 300 is initialized at step 302 and proceeds to step 304, where the media gateway 109 carries signaling and control information (e.g., contained in one or more ISDN messages) for customer calls over a primary D channel that is provisioned on a first media gateway card $122_1$. The signaling and control information may include, for example, messages related to call setup or tear down and caller identification.

In step 306, the media gateway 109 detects a failure of the primary D channel. In one embodiment, this failure is a hard failure. For example, the primary D channel itself may have failed, or the first media gateway card (e.g., media gateway card $122_1$) may have failed entirely.

In step 308, the media gateway 109 switches to the backup D channel, which is provisioned on a second media gateway card that is different from the first media gateway card (e.g., media gateway card $122_n$). Thus, the media gateway 109 begins to carry the signaling and control information over the backup D channel. The method 200 then terminates in step 310.

Figure 4:
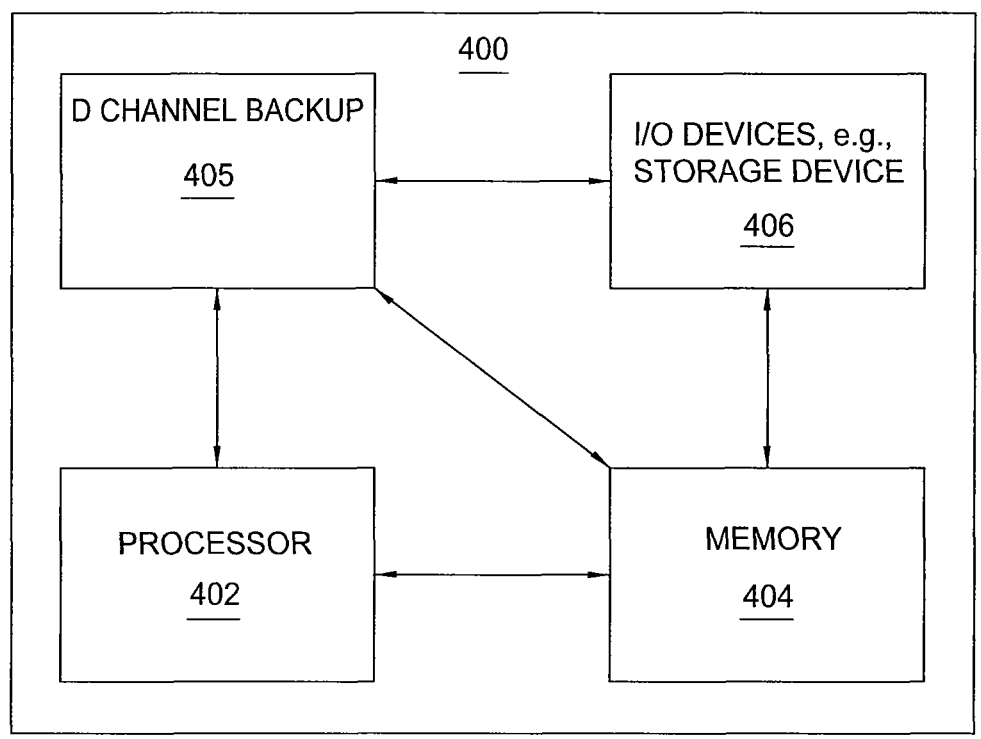
FIG. 4 is a high level block diagram of the backup signaling channel provision method that is implemented using a general purpose computing device.

FIG. 4 is a high level block diagram of the backup signaling channel provision method that is implemented using a general purpose computing device 400. The general purpose computing device 400 may be part of a media gateway, for example. In one embodiment, a general purpose computing device 400 comprises a processor 402, a memory 404, a D channel backup module 405 and various input/output (I/O) devices 406 such as a display, a keyboard, a mouse, a modem, a stylus, a joystick, a keypad, controller, a network interface, and the like. In one embodiment, at least one I/O device is a storage device (e.g., a disk drive, an optical disk drive, a floppy disk drive). It should be understood that the D channel backup module 405 can be implemented as a physical device or subsystem that is coupled to a processor through a communication channel.

Alternatively, the D channel backup module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the D channel backup module 405 for provisioning a backup D channel described herein with reference to the preceding Figures can be stored on a computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for provisioning a backup D channel in a media gateway, the method comprising:
   provisioning, via a processor, a primary D channel for an integrated services digital network application on a first media gateway card in the media gateway;
   provisioning, via the processor, the backup D channel for the integrated services digital network application on a second media gateway card in the media gateway where the second media gateway card is a physically different media gateway card from the first media gateway card, wherein the first media gateway card and the second media gateway card each bridges a core packet network and a time division multiplexing network and provides a call control and signaling functionality, wherein the backup D channel serves as a backup to the primary D channel on the first media gateway card and a plurality of other primary D channels, wherein each one of the plurality of other primary D channels is provisioned on a plurality of different media gateway cards;
   carrying, via the processor, signaling and control information relating to calls processed by the media gateway over the primary D channel on the first media gateway card, wherein the signaling and control information is contained in an integrated services digital network message;
   detecting, via the processor, a failure of the primary D channel caused by a hard failure of the first media gateway card, but not a hard failure of the primary D channel; and
   carrying, via the processor, the signaling and control information over the backup D channel on the second media gateway card in response to the detecting.

2. A non-transitory computer readable storage medium containing an executable program for provisioning a backup D channel in a media gateway, where when executed by a processor the program performs operations, the operations comprising:
   provisioning a primary D channel for an integrated services digital network application on a first media gateway card in the media gateway;
   provisioning the backup D channel for the integrated services digital network application on a second media gateway card in the media gateway where the second media gateway card is a physically different media gateway card from the first media gateway card, wherein the first media gateway card and the second media gateway card each bridges a core packet network and a time division multiplexing network and provides a call control and signaling functionality, wherein the backup D channel serves as a backup to the primary D channel on the first media gateway card and a plurality of other primary D channels, wherein each one of the plurality of other primary D channels is provisioned on a plurality of different media gateway cards;
   carrying signaling and control information relating to calls processed by the media gateway over the primary D channel on the first media gateway card, wherein the signaling and control information is contained in an integrated services digital network message;
   detecting a failure of the primary D channel caused by a hard failure of the first media gateway card, but not a hard failure of the primary D channel; and
   carrying the signaling and control information over the backup D channel on the second media gateway card in response to the detecting.

3. A media gateway, comprising:
   a first media gateway card on which is provisioned a primary D channel for an integrated services digital network application, wherein the primary D channel carries control and signaling information relating to calls processed by the media gateway, wherein the control and signaling information is contained in an integrated services digital network message; and
   a second media gateway card that is a physically different media gateway card from the first media gateway card on which is provisioned a backup D channel for the integrated services digital network application, wherein the backup D channel serves as a backup to the primary D channel on the first media gateway card and a plurality of other primary D channels, wherein each one of the plurality of other primary D channels is provisioned on a plurality of different media gateway cards, wherein the backup D channel on the second media gateway card carries the control and signaling information when the primary D channel on the first media gateway card fails due to a hard failure of the first media gateway card, but not a hard failure of the primary D channel, wherein the first media gateway card and the second media gateway card each bridges a core packet network and a time division multiplexing network and provides a call control and signaling functionality.

4. The media gateway of claim 3, further comprising:
   a third media gateway card on which is provisioned as an additional primary D channel, wherein the backup D channel also serves as a backup to the additional primary D channel.

* * * * *